(No Model.)

G. T. SHEPLEY.
DRIVE SAW.

No. 398,350. Patented Feb. 19, 1889.

Witnesses:
Everett B. Gerrish.
Francis M. Boutwell.

Inventor:
Granville T. Shepley.

UNITED STATES PATENT OFFICE.

GRANVILLE T. SHEPLEY, OF TOWNSEND, MASSACHUSETTS.

DRIVE-SAW.

SPECIFICATION forming part of Letters Patent No. 398,350, dated February 19, 1889.

Application filed October 3, 1888. Serial No. 287,124. (No model.)

*To all whom it may concern:*

Be it known that I, GRANVILLE T. SHEPLEY, of Townsend, in the county of Middlesex and State of Massachusetts, have invented a new and useful Improvement in Drive-Saws, which invention I will describe as follows, reference being had to the accompanying drawings, which form a part of this specification, like letters indicating liks parts in the different figures thereof.

Figure 1:
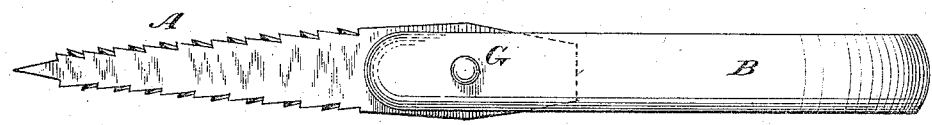
Figure 2:
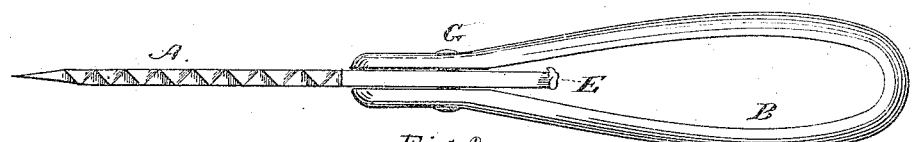
Figure 3:
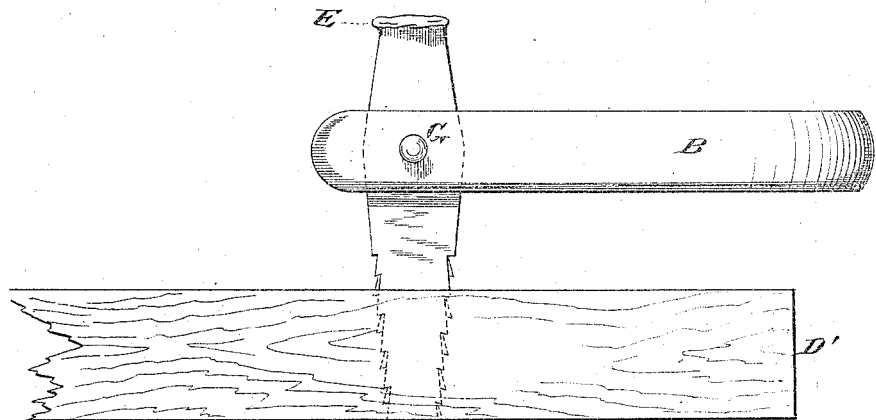

Figure 1 of the drawings is a side elevation showing my saw in position for work. Fig. 2 is a top plan showing the saw in a similar position. Fig. 3 is a side elevation showing the saw immediately after it has been driven into a board; and Fig. 4 is a view in perspective showing the saw in position for use, but with the saw not carried out to its full length.

My invention consists in a saw so constructed that it can be driven into a board or other article and then be used to saw a piece out of such article, thus avoiding the necessity of boring a hole in said article before commencing to saw.

A is a saw, and B the handle thereof, said saw turning within said handle upon the pivot G. It will be observed that the saw comes to a sharp point at the outer end, which feature appears in the drawings, except in Fig. 4, which figure is not carried out to its full length. The saw is concaved on both sides (one side being thus shown in Fig. 4) to prevent pinching when in operation, and thus obviate the necessity of setting the teeth for that purpose. The saw could be made and used with teeth upon only one side; but it is obvious that to have them upon both sides, as shown in the drawings, makes a much more effective instrument.

Figure 4:
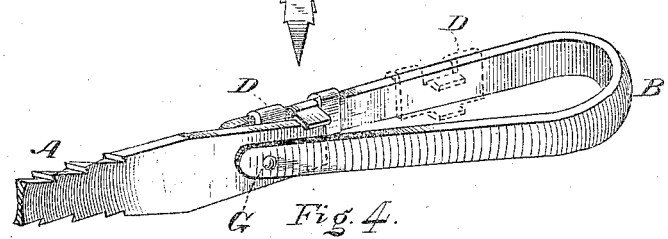

In Fig. 4 appears the slide D in the position for holding the saw A firmly when sawing, and the dotted lines show the slide drawn back, as it is when the saw is in the position shown in Fig. 3.

The operation of my invention is as follows: The slide D is first drawn back, as above described. The saw is then turned upon the pivot G to at or near a right angle with the handle B. A blow is then struck with some suitable instrument upon the end E of the saw, driving the saw into the board D', as shown in Fig. 3; the handle B is again turned to a position in line with the saw A; the slide D is pushed down to hold the saw and handle firmly together, as before described, and the operator is ready to saw a piece out of the board or other article.

When the tool is not in use, the slide D can be moved back, and the saw turned upon the pivot G until it is in line with and within the handle B. The slide can then be moved far enough to hold the saw in this position, and the tool can be carried about conveniently. It is of course obvious that to accomplish this the handle must be long enough to receive the saw.

The handle herein described and shown is a good and convenient one for the purpose described; but other handles may be adopted that would answer the purpose. My invention consists in the saw only, as described.

What I claim as new, and desire to secure by Letters Patent, is—

A drive-saw provided with two sets of teeth, said saw coming to a point at its outer end and concaved upon both sides, the saw being movable upon a pivot within the handle thereof, substantially in the manner described and shown, and for the purposes set forth.

GRANVILLE T. SHEPLEY.

Witnesses:
FRANCIS M. BOUTWELL,
HARRY A. STONE.